US012780441B2

(12) United States Patent
Mertes et al.

(10) Patent No.: US 12,780,441 B2
(45) Date of Patent: Nov. 3, 2026

(54) AIRCRAFT INCLUDING A STRUCTURE, A TANK AND MEANS FOR FIXING THE TANK TO THE STRUCTURE

(71) Applicant: Airbus Operations SAS, Toulouse (FR)

(72) Inventors: Anthony Mertes, Toulouse (FR); Noémie Michies, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 19/407,790

(22) Filed: Dec. 3, 2025

(65) Prior Publication Data

US 2026/0159244 A1 Jun. 11, 2026

(30) Foreign Application Priority Data

Dec. 5, 2024 (FR) ....................................... 2413527

(51) Int. Cl.

| | |
|---|---|
| ***B64D 37/06*** | (2006.01) |
| ***B64D 37/04*** | (2006.01) |
| ***F17C 13/08*** | (2006.01) |
| *B64D 1/08* | (2006.01) |

(52) U.S. Cl.

CPC ............. *B64D 37/04* (2013.01); *B64D 37/06* (2013.01); *F17C 13/083* (2013.01); *B64D 1/08* (2013.01); *F17C 2205/0107* (2013.01)

(58) Field of Classification Search

CPC .......... B64D 1/08; B64D 37/04; B64D 37/06; B64D 37/12; B64G 1/402

See application file for complete search history.

(56) References Cited

U.S. PATENT DOCUMENTS

| | | | | |
|---|---|---|---|---|
| 3,416,762 A * | 12/1968 | Headrick | B64D 37/12 | 410/97 |
| 4,161,301 A * | 7/1979 | Beardsley | B64D 1/10 | 89/1.51 |
| 4,923,148 A * | 5/1990 | Fillingham | B64D 1/08 | 89/1.51 |
| 9,963,030 B2 * | 5/2018 | Kirk | B64C 1/20 | |
| 11,851,210 B2 | 12/2023 | Kawai et al. | | |
| 11,926,431 B2 * | 3/2024 | Barmichev | B64D 9/003 | |

(Continued)

FOREIGN PATENT DOCUMENTS

| | | | |
|---|---|---|---|
| CN | 204279982 U | 4/2015 | |
| CN | 120863892 A * | 10/2025 | B64D 37/06 |

(Continued)

OTHER PUBLICATIONS

French Search Report for corresponding French Patent Application No. 2413527 dated May 8, 2025; 2 pages.

*Primary Examiner* — Brian M O'Hara
(74) *Attorney, Agent, or Firm* — Greer, Burns & Crain, Ltd.

(57) ABSTRACT

An aircraft that includes a floor, a tank and a connection between the tank to the floor. The connection include guide rails fixed to the floor, a cradle with guide grooves cooperating with the guide rails, two rear links articulated between the cradle and the tank, two front links fixed to the cradle and articulated on the tank, a lateral link articulated between the cradle and a lower part of the tank, and two intermediate links articulated between the cradle and the tank.

10 Claims, 7 Drawing Sheets

(56) References Cited

U.S. PATENT DOCUMENTS

| | | | | |
|---|---|---|---|---|
| 12,296,973 | B2 * | 5/2025 | Mertes | B64D 37/04 |
| 12,312,096 | B2 * | 5/2025 | Geliot | F02C 7/20 |
| 12,570,408 | B2 * | 3/2026 | Hegenbart | B64D 37/12 |
| 12,617,529 | B2 * | 5/2026 | Sarigul-Klijn | B64D 1/08 |
| 2014/0117163 | A1 | 5/2014 | Simpson | |
| 2021/0275845 | A1 | 9/2021 | Turner et al. | |
| 2024/0150032 | A1 | 5/2024 | Mertes | |

FOREIGN PATENT DOCUMENTS

| | | | | |
|---|---|---|---|---|
| EP | 4368516 | A1 | 5/2024 | |
| FR | 3151024 | A1 * | 1/2025 | B64D 37/06 |

* cited by examiner

AIRCRAFT INCLUDING A STRUCTURE, A TANK AND MEANS FOR FIXING THE TANK TO THE STRUCTURE

CROSS-REFERENCES TO RELATED APPLICATIONS

This application claims the benefit of French Patent Application Number FR2413527 filed on Dec. 5, 2024, the entire disclosure of which is incorporated herein by way of reference.

FIELD OF THE INVENTION

The present invention concerns an aircraft including a structure, a tank, in particular a hydrogen tank, and fixing means for fixing the tank to the structure.

BACKGROUND OF THE INVENTION

In the case of kerosene used to fuel the engines of an aircraft, it is known to arrange the kerosene tank in a wing of the aircraft.

In order to reduce the consumption of kerosene in aircraft engines, it is known to use hydrogen as fuel. The tank, which is of cylindrical shape, cannot be installed in the wings and is then disposed in the fuselage of the aircraft.

The aircraft then includes a structure to which the tank is fixed by fixing means.

At present, the fixing means are not optimized and it is therefore necessary to find a new arrangement. Furthermore, it is desirable to find an arrangement enabling easy removal of the tank from the aircraft if required, in particular parallel to the longitudinal axis of the aircraft.

SUMMARY OF THE INVENTION

An object of the present invention is to propose an aircraft including a structure, at least one cylindrical tank and fixing means for fixing each tank to the structure.

To this end, there is proposed an aircraft including:

a fuselage with a floor, a tank housed in the fuselage above the floor and having a longitudinal direction and a vertical longitudinal median plane, fixing means for fixing the tank to the floor that include:

first guide means fixed to the floor, a cradle including second guide means cooperating with the first guide means to produce a sliding connection parallel to the longitudinal direction, to the rear of the tank, on either side of the vertical longitudinal median plane, a rear link a first end of which is articulated on the cradle and a second end of which is articulated on the tank, at the front relative to the rear links, on either side of the vertical longitudinal median plane, a front link a first end of which is fixed to the cradle and a second end of which is articulated on the tank, between the front links and the rear links, a lateral link a first end of which is articulated on the cradle and a second end of which is articulated on a lower part of the tank, and between the lateral link and the rear links, on either side of the vertical longitudinal median plane, an intermediate link a first end of which is articulated on the cradle and a second end of which is articulated on the tank.

Such an arrangement makes it possible to use fixing means that are optimized in particular for the transfer of forces from the tank to the structure and removal of the tank parallel to the longitudinal axis of the aircraft.

Each of the intermediate links is advantageously inscribed in a plane globally parallel to the floor.

The front links are advantageously inscribed in a plane perpendicular to the longitudinal direction.

The rear links are advantageously inscribed in a plane perpendicular to the longitudinal direction.

The lateral link is advantageously inscribed in a plane perpendicular to the longitudinal direction.

Each link is advantageously a double link.

The first guide means advantageously take the form of two rails parallel to the longitudinal direction, each rail having a web extending in a plane perpendicular to the floor and parallel to the longitudinal direction and a flange rigidly connected to the web extending in a plane parallel to the floor and the second guide means for each rail advantageously take the form of two sliders mounted to slide on said rail, each slider including a groove arranged to receive the web and the flange.

The fixing means advantageously include for each slider a first locking pin the axis of which is perpendicular to the vertical longitudinal median plane and housed simultaneously in a first bore of the web and in a second bore of the slider and a second locking pin the axis of which is perpendicular to the floor and simultaneously housed in a third bore of the flange and in a fourth bore of the slider.

The aircraft advantageously includes frames and reinforcing beams, each reinforcing beam being fixed between the floor and a frame.

The fixing means advantageously include a spreader articulated in the middle on the cradle at the level of the vertical longitudinal median plane and each end of the spreader is articulated to the first end of an intermediate link.

BRIEF DESCRIPTION OF THE DRAWINGS

The features of the invention mentioned hereinabove and others will become more clearly apparent on reading the following description of one embodiment, said description being given with reference to the appended drawings, in which.

DETAILED DISCLOSURE OF THE PREFERRED EMBODIMENTS

Figure 1:
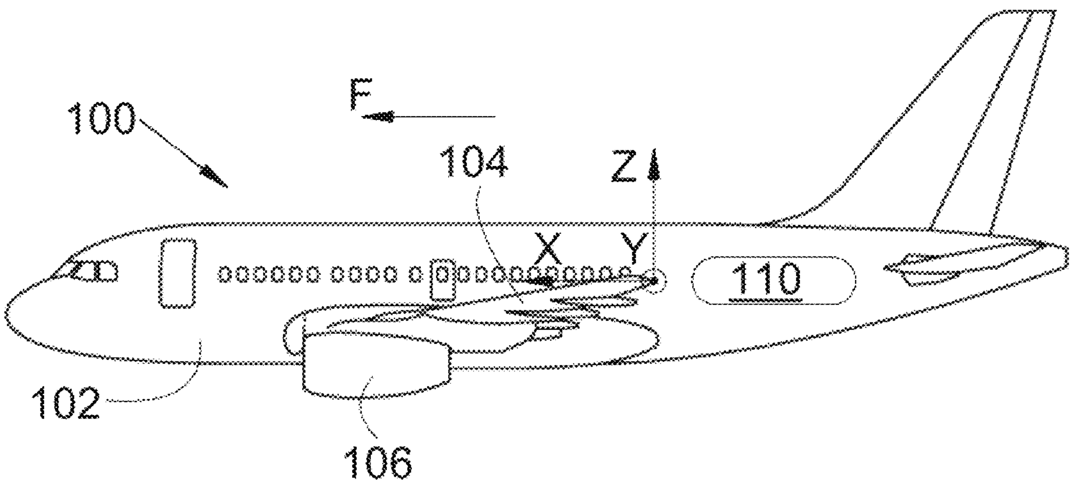
FIG. 1 is a side view of an aircraft according to the invention.
Figure 2:
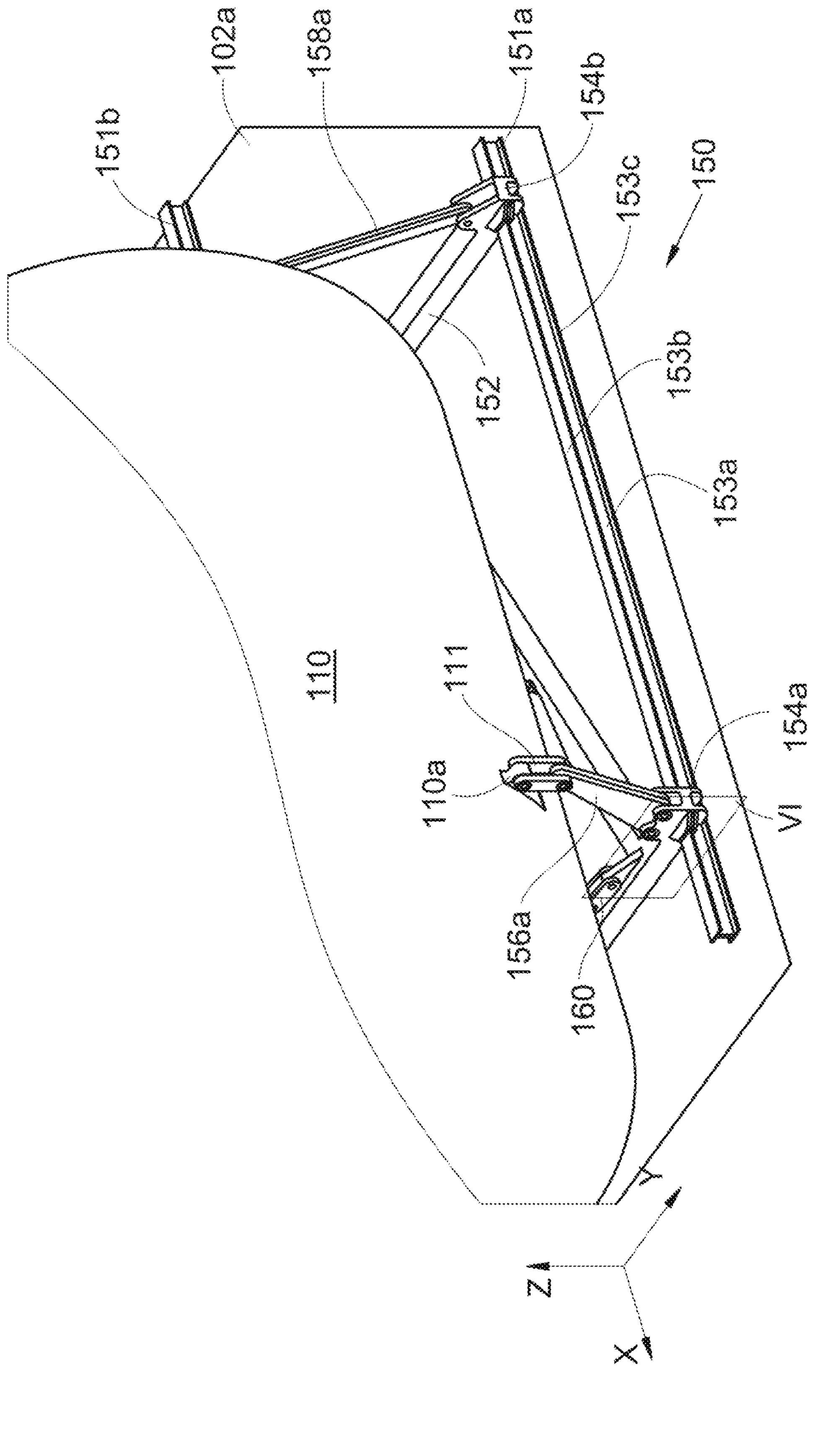
FIG. 2 is a diagrammatic representation in perspective of a tank and fixing means employed by the invention.
Figure 3:
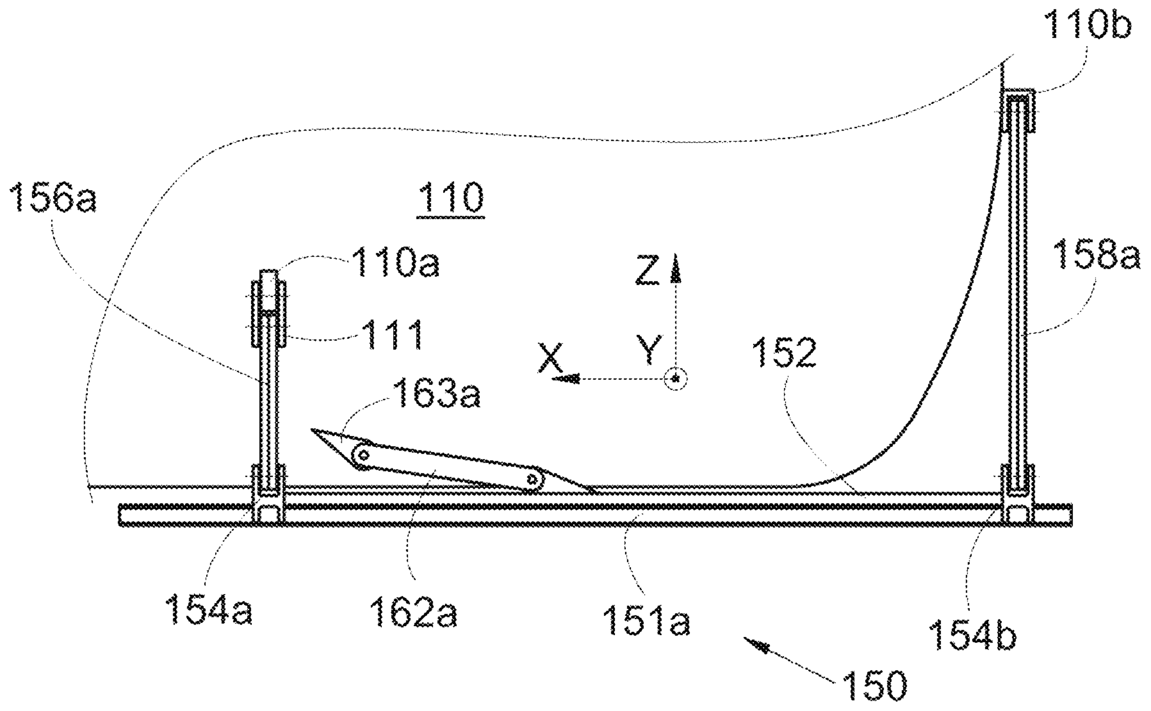
FIG. 3 is a schematic representation in side view of the tank and the fixing means.

In the following description terms relating to a position refer to an aircraft in the normal flight position, that is to say as represented in FIG. 1. The arrow F indicates the direction of forward movement of an aircraft 100.

FIG. 1 shows an aircraft 100 that includes a fuselage 102 to each side of which is fixed a wing 104 that carries at least one engine 106 using fuel such as hydrogen or kerosene.

The fuel is stored in at least one tank 110 that is accommodated inside and fixed to the fuselage 102, here at the rear end of the fuselage 102, by fixing means.

In the description there is mentioned a single tank 110 but there can be more than one tank and in particular two tanks disposed on respective opposite sides of the vertical median plane of the aircraft 100 or one behind the other.

The tank 110 has a shape of revolution about a revolution axis and a circular or elliptical section.

In the following description and by convention X denotes the longitudinal and horizontal direction of the tank 110 passing through the axis of revolution of the tank 110, Y denotes the transverse horizontal direction and Z denotes the vertical direction, these three directions X, Y and Z being mutually orthogonal. The tank 110 also has a vertical longitudinal median plane XZ that contains the longitudinal direction X and the vertical direction Z. The longitudinal direction X is globally parallel to the longitudinal axis of the aircraft 100.

Figure 4:
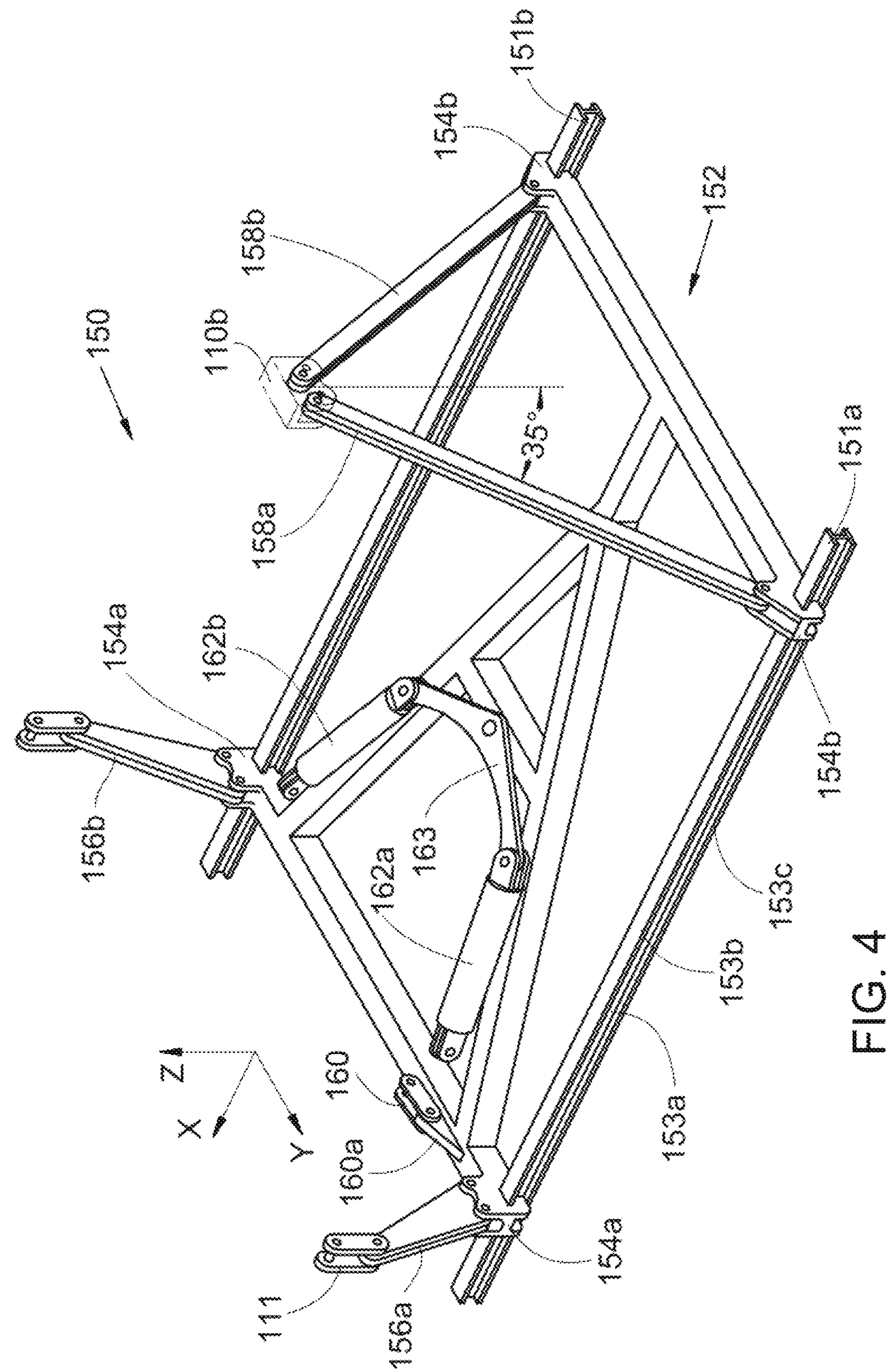
FIG. 4 is a perspective view of the fixing means.
Figure 5:
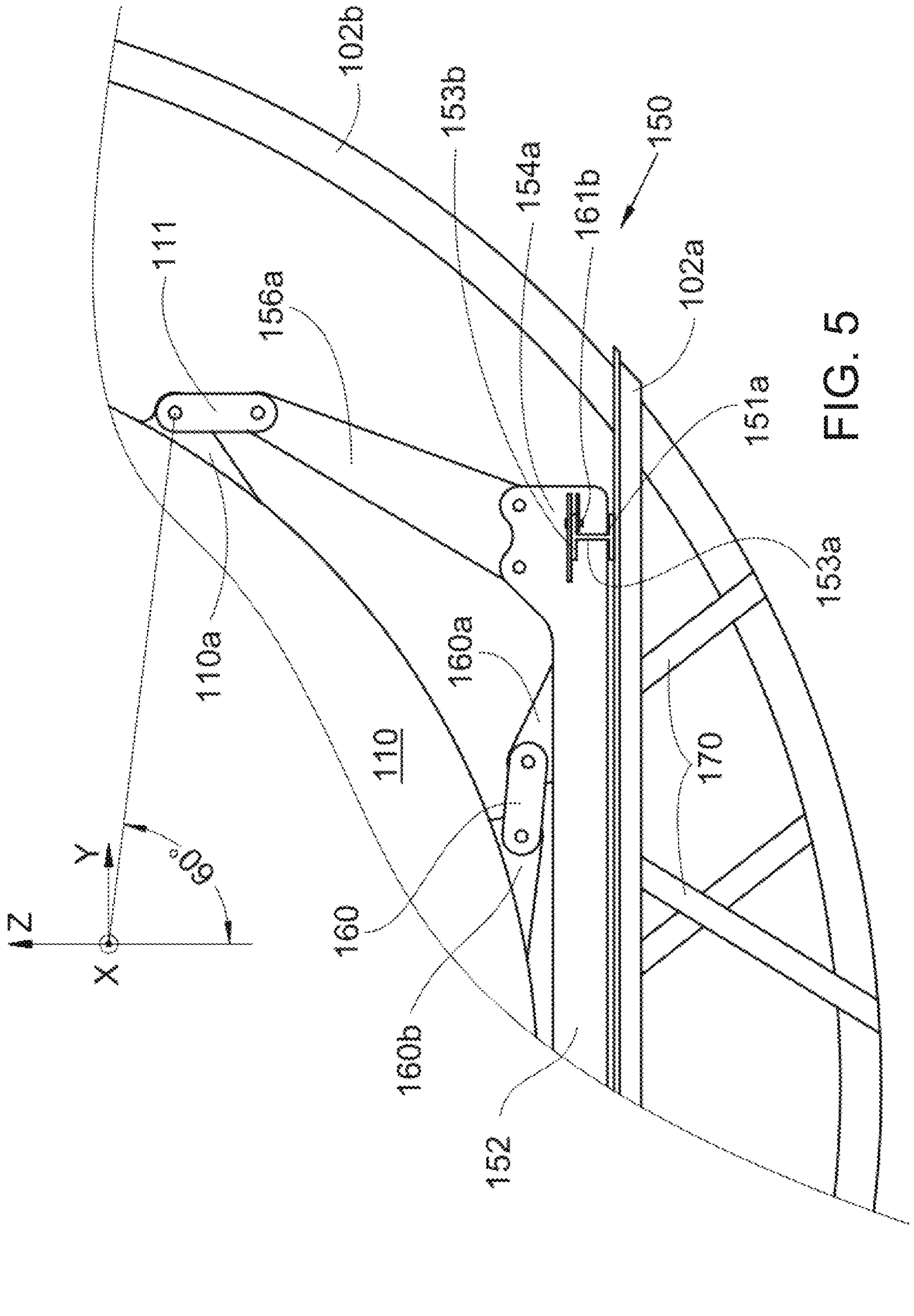
FIG. 5 is a front view of the tank and the fixing means.
Figure 6:
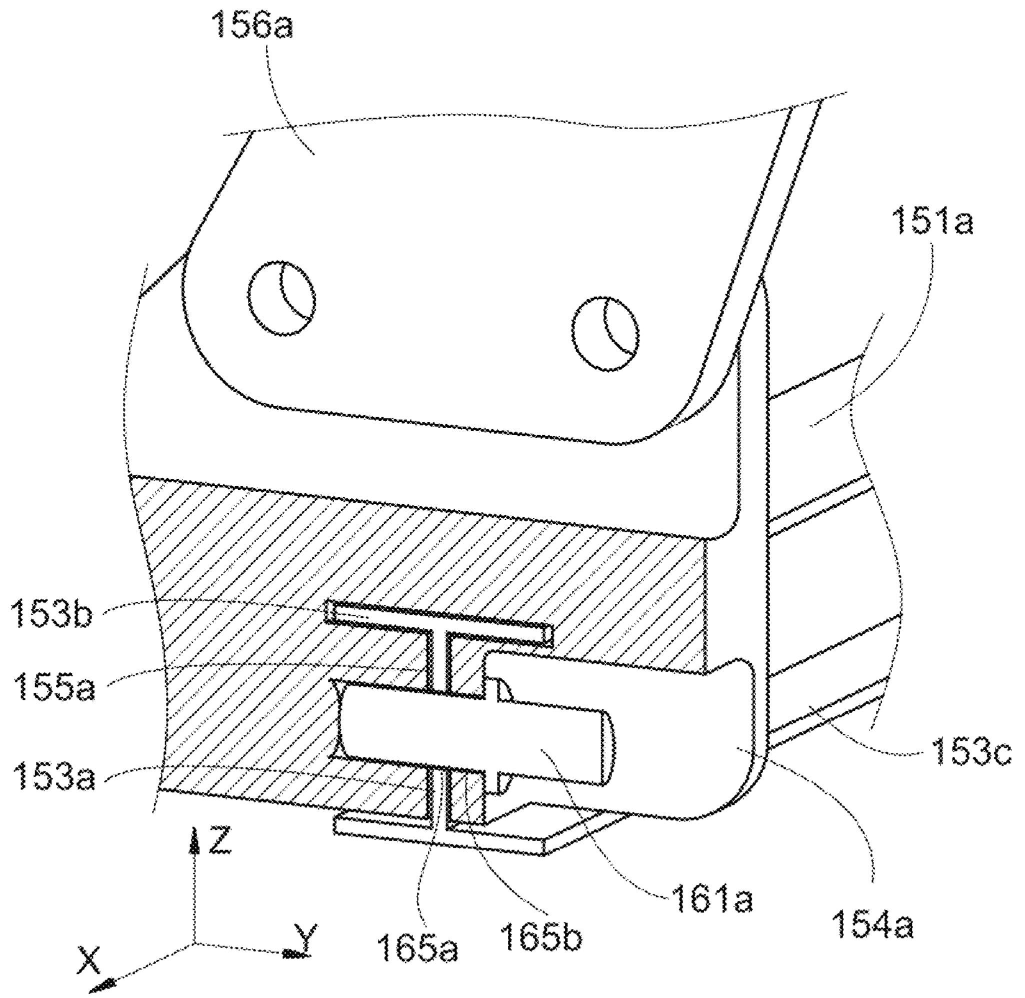
FIG. 6 is a view in section of the fixing means on the plane VI in FIG. 2.
Figure 7:
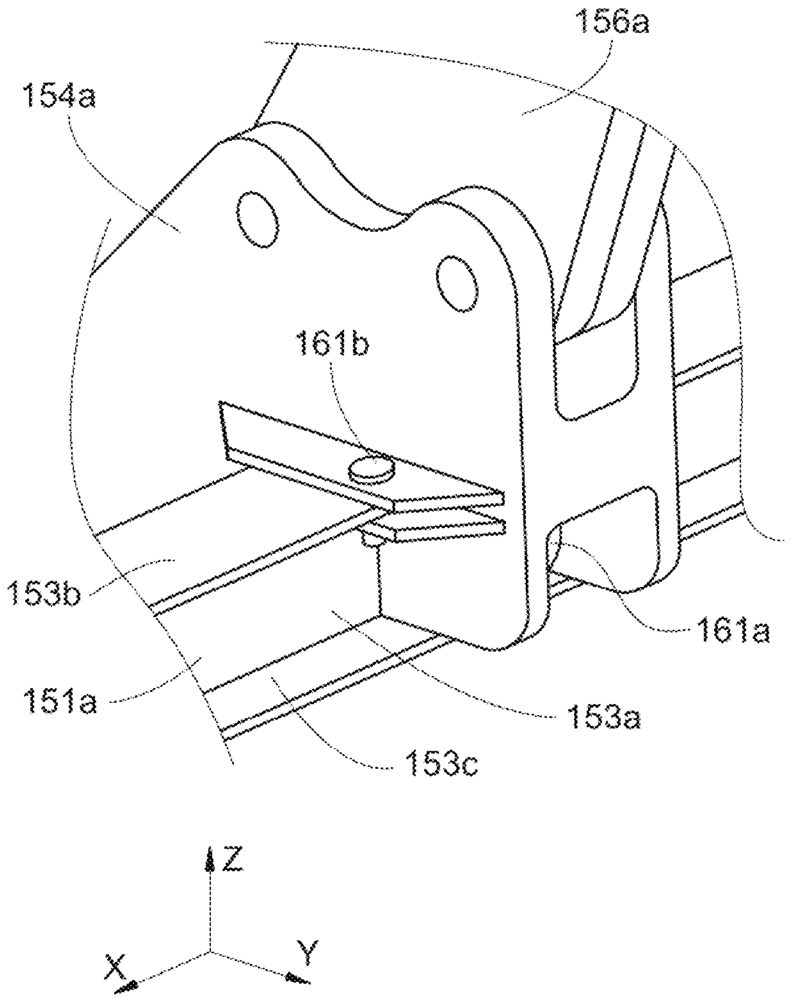
FIG. 7 is an enlargement of a detail of the fixing means.

FIGS. 2 to 7 show the tank 110 and the fixing means 150 that fix the tank 110 to a floor 102*a* of the fuselage 102. As FIG. 5 shows, the floor 102*a* is conventionally fixed to frames 102*b* of the fuselage 102 that extend around the longitudinal direction of the aircraft 100 and one after the other in the longitudinal direction of the aircraft 100. In the conventional way a skin of the fuselage 102 is fixed to the exterior of the frames 102*b*.

The tank 110 is housed in the fuselage 102 and above the floor 102*a*.

The fixing means 150 include first guide means 151*a-b* that are fixed to the floor 102*a*.

Here the first guide means 151*a-b* take the form of two rails parallel to the longitudinal direction X and disposed one alongside the other and on respective opposite side of the vertical longitudinal median plane XZ. Each rail includes a web 153*a* that extends vertically in a plane that is perpendicular to the floor 102*a* and parallel to the longitudinal direction X. Each rail also includes a flange 153*b* that is rigidly connected to the web 153*a* and extends horizontally in a plane parallel to the floor 102*a*, here at the top of the web 153*a*.

In this embodiment of the invention the flange 153*b* extends on either side of the web 153*a*, but it could extend on only one side.

Here each rail has an I-shape profile with a bottom flange 153*c* that is fixed to the floor 102*a*. Generally speaking, the web 153*a* is fixed to the floor 102*a* by any appropriate means such as screwing elements for fixing the lower flange 153*c*.

The fixing means 150 also include a cradle 152 that includes second guide means 154*a-b* that cooperate with the first guide means 151*a-b* to make a sliding connection parallel to the longitudinal direction X. As described hereinafter the tank 110 is fixed onto the cradle 152 and it is therefore possible to move it if necessary by causing the cradle 152 to slide on the first guide means 151*a-b*.

In the embodiment of the invention described here the second guide means 154*a-b* take the form of sliders integrated into the cradle 152. There are two sliders for each rail. There are therefore two starboard sliders and two port sliders, that is to say sliders on respective opposite side of the vertical longitudinal median plane XZ, and the port, respectively starboard, sliders each include a front slider and a rear slider.

Each slider is mounted to slide on the associated rail and here each slider includes a groove 155*a*, in particular a T-shape groove, arranged to receive the web 153*a* and the flange 153*b*.

The fixing means 150 at the rear of the tank 110 include on respective opposite sides of the vertical longitudinal median plane XZ a rear link 158*a-b*. Thus there are two rear links 158*a-b* and each has a first end that is articulated on the cradle 152 and a second end that is articulated on the tank 110, here by means of a rear yoke 110*b* (in chain-dotted line in FIG. 4). Here each articulation takes the form of rotation about an axis parallel to the longitudinal direction X and here the second ends are globally fixed at the level of the longitudinal direction X of the tank 110.

The rear links 158*a-b* transfer forces in the vertical direction Z and the transverse direction Y and are disposed to the rear of the tank 110. In one particular embodiment each rear link 158*a-b* is at an angle of 35°±5° to the vertical longitudinal median plane XZ.

At the front relative to the rear links 158*a-b* the fixing means 150 include on respective opposite sides of the vertical longitudinal median plane XZ a front link 156*a-b*. Each front link 156*a-b* has a first end that is fixed to the cradle 152 and a second end that is articulated on the tank 110. The front links 156*a-b* transfer forces in the vertical direction Z and here they are located between the tank 110 and the floor 102*a*.

Here each second end is articulated on a lateral lug 110*a* of the tank 110 by means of an intermediate link 111 articulated between the lateral lug 110*a* and the second end. Here each articulation takes the form of rotation about an axis parallel to the longitudinal direction X. In one particular embodiment the point of fixation to the lateral lug 110*a* is at an angle of 60°±5° to the vertical longitudinal median plane XZ. This fixing is thus somewhat toward the underside and sides of the tank 110 relative to the vertical longitudinal median plane XZ.

The fixing means 150 between the front links 156*a-b* and the rear links 158*a-b* include a lateral link 160. Here the lateral link 160 is located between the front links 156*a-b*, but it can be moved farther to the rear. The lateral link 160 transfers forces in the transverse direction Y and here the lateral link 160 is arranged under the tank 110.

The lateral link 160 has a first end articulated on the cradle 152 and a second end articulated on a lower part of the tank 110. Here each articulation takes the form of rotation about an axis parallel to the longitudinal direction X.

Here the first end of the lateral link 160 is fixed to the cradle 152 by means of a first lug 160*a* of the cradle 152 and the second end of the lateral link 160 is fixed to a lower part of the tank 110, here by means of a second lug 160*b* of the tank 110.

The lateral link 160 is globally parallel to the transverse direction Y and under the tank 110.

The fixing means 150 between the lateral link 160 and the rear links 158*a-b* include on respective opposite sides of the vertical longitudinal median plane XZ an intermediate link 162*a-b*. There are therefore two intermediate links 162*a-b* and each has a first end articulated on the cradle 152 and a second end articulated on the tank 110.

The intermediate links 162*a-b* transfer forces in the longitudinal direction X and are under the tank 110. In the embodiment of the invention represented in FIG. 5 the intermediate links 162*a-b* are not duplicated but in a different embodiment that is not represented the intermediate links 162*a-b* can be duplicated for reasons of redundancy. Thus there are then two intermediate links 162*a-b* on either side of vertical longitudinal median plane XZ.

Here the second end of the intermediate link 162*a-b* is fixed to the tank 110 by means of an intermediate lug 163*a* of the tank 110.

Here the articulations of the second ends of the intermediate links 162*a-b* are rotations about an axis globally parallel to the vertical direction Z.

Such an arrangement enables isostatic fixing of the tank 110 to the cradle 152. Such fixing avoids the transfer of forces from the fuselage 102 to the tank 110 while ensuring the transfer of forces from the cradle 152 to the fuselage 102. Furthermore, such an arrangement enables the tank 110 to be moved in the longitudinal direction X if necessary.

In one particular embodiment the point of fixation to the intermediate lug 163*a* is at an angle of 20°±5° to the vertical longitudinal median plane XZ. This fixing is therefore somewhat toward the underside and the sides of the tank 110 relative to the vertical longitudinal median plane XZ.

Here the intermediate links 162*a-b* are inscribed in a plane globally perpendicular to the vertical direction Z and globally horizontal, that is to say globally parallel to the floor 102*a*.

Here the front links 156*a-b* are inscribed in a plane perpendicular to the longitudinal direction X, that is to say vertical. Similarly, the rear links 158*a-b* and the lateral link 160 are here inscribed in a plane perpendicular to the longitudinal direction X.

For reasons of redundancy, each link is a double link, that is to say comprises two identical links in parallel.

Here each link is fixed by a yoke connection consisting of a female yoke and a male yoke inserted in and fixed into the female yoke by inserting a pin the axis of which is parallel to the corresponding articulation axis.

In the embodiment of the invention shown more particularly in FIG. 4 the fixing means 150 include a spreader 163 for fixing the first ends of the intermediate links 162*a-b* to the cradle 152 and enable transfer of forces in the longitudinal direction X.

The spreader is articulated at its middle to the cradle 152 at the level of the vertical longitudinal median plane XZ by a pivot connection the axis of which is globally parallel to the vertical direction Z, that is to say perpendicular to the floor 102*a*.

Each end of the spreader 163 is articulated to a first end of an intermediate link 162*a-b* by a pivot connection the axis of which is globally parallel to the vertical direction Z. To this end the first end of each intermediate link 162*a-b* takes the form of a female yoke in which is inserted and fixed by fitting a pin the spreader 163 forming a male yoke.

To immobilize the cradle 152 in translation relative to the first guide means 151*a-b* the fixing means 150 include removable stop means. The stop means for each slider comprise a first locking pin 161*a* and a second locking pin 161*b*.

Each first locking pin 161*a* has its axis perpendicular to the vertical longitudinal median plane XZ, that is to say horizontal, and transfers forces in the longitudinal direction X and the vertical direction Z.

Each second locking pin 161*b* has its axis perpendicular to the floor 102*a*, that is to say vertical, and transfers forces in the transverse direction Y.

Each first locking pin 161*a* is simultaneously housed in a first bore 165*a* of the web 153*a* and in a second bore 165*b* of the corresponding slider. The second bore 165*b* extends on either side of the web 153*a* and is coaxial with the first bore 165*a*. When the first locking pin 161*a* is inserted and locked in the bores 165*a-b* it immobilizes the cradle 152. Any movement of the cradle 152 must therefore be preceded by removing each first locking pin 161*a*.

Similarly, each second locking pin 161*b* is housed simultaneously in a third bore of the flange 153*b* and in a fourth bore of the corresponding slider. The second bore 165*b* extends on either side of the flange 153*b* and is coaxial with the third bore. When the second locking pin 161*b* is inserted and immobilized in the bores it immobilizes the cradle 152. Any movement of the cradle 152 must thereafter be preceded by removing each second locking pin 161*b*.

Each first locking pin 161*a* and each second locking pin 161*b* cross the groove 155*a* when in the immobilizing position. The locking pins 161*a-b* are retained in the slider for example by a force-fit, screwing or otherwise.

To transfer forces from the tank 110 to the structure of the aircraft 100 in a crash and therefore to prevent deformation of the tank 110 the aircraft 100 includes reinforcing beams 170 and each reinforcing beam 170 is fixed between the floor 102*a* and a frame 102*b*. Forces coming from the tank 110 are therefore transferred to the frame 102*b* via the reinforcing beams 170.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
- a fuselage with a floor;
- a tank housed in the fuselage above the floor and having a longitudinal direction and a vertical longitudinal median plane; and,
- fixing means for fixing the tank to the floor that include:
  - first guide means fixed to the floor,
  - a cradle including second guide means cooperating with the first guide means to produce a sliding connection parallel to the longitudinal direction,
  - on both sides of the vertical longitudinal median plane, a rear link, on a rear of the tank, each rear link having a first end articulated on the cradle and a second end articulated on the tank,
  - on both sides of the vertical longitudinal median plane, a front link, at a front of the tank relative to the rear links, each front link having a first end fixed to the cradle and a second end articulated on the tank,
  - between the front links and the rear links, a lateral link having a first end articulated on the cradle and a second end articulated on a lower part of the tank, and
  - on both sides of the vertical longitudinal median plane, an intermediate link, between the lateral link and the rear links, each intermediate link having a first end articulated on the cradle and a second end articulated on the tank.

2. The aircraft according to claim 1, wherein each intermediate link is inscribed in a plane globally parallel to the floor.

3. The aircraft according to claim 1, wherein the front links are inscribed in a plane perpendicular to the longitudinal direction.

4. The aircraft according to claim 1, wherein the rear links are inscribed in a plane perpendicular to the longitudinal direction.

5. The aircraft according to claim 1, wherein the lateral link is inscribed in a plane perpendicular to the longitudinal direction.

6. The aircraft according to claim 1, wherein each link is a double link.

7. The aircraft according to claim 1, wherein the first guide means comprise two rails parallel to the longitudinal direction, each rail having a web extending in a plane perpendicular to the floor and parallel to the longitudinal direction and a flange rigidly connected to the web extending in a plane parallel to the floor, and wherein the second guide means, for each rail, comprise two sliders mounted to slide on a rail, each slider including a groove configured to receive the web and the flange.

8. The aircraft according to claim 7, wherein the fixing means include, for each slider, a first locking pin with an axis perpendicular to the vertical longitudinal median plane and housed simultaneously in a first bore of the web and in a second bore of the slider, and a second locking pin having an axis perpendicular to the floor and simultaneously housed in a third bore of the flange and in a fourth bore of the slider.

9. The aircraft according to claim 1, further comprising:

frames and reinforcing beams, each reinforcing beam being fixed between the floor and a frame.

10. The aircraft according to claim 1, wherein the fixing means include a spreader articulated in a middle on the cradle at a level of the vertical longitudinal median plane and each end of the spreader is articulated to the first end of an intermediate link.

* * * * *